United States Patent
Al-Yousef et al.

(10) Patent No.: US 11,913,589 B2
(45) Date of Patent: Feb. 27, 2024

(54) PIPELINE WATER REMEDIATION BASED ON UPSTREAM PROCESS OPERATING PARAMETERS

(71) Applicant: Saudi Arabian Oil Company, Dhahran (SA)

(72) Inventors: Khaled Khalifah Al-Yousef, Dhahran (SA); Fahad Nasser Al-Homaid, Dhahran (SA); Alya Usama Al-Musabbeh, Dhahran (SA); Ahmad Hussain Al-Zubail, Dhahran (SA); Saad Mousa, Dhahran (SA); Syed Abrar Ahmed, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 920 days.

(21) Appl. No.: 16/908,015

(22) Filed: Jun. 22, 2020

(65) Prior Publication Data

US 2021/0396341 A1 Dec. 23, 2021

(51) Int. Cl.
*F16L 55/24* (2006.01)
*B01D 17/02* (2006.01)
(Continued)

(52) U.S. Cl.
CPC .............. *F16L 55/24* (2013.01); *B01D 17/02* (2013.01); *B01D 17/12* (2013.01); *B08B 9/055* (2013.01);
(Continued)

(58) Field of Classification Search
None
See application file for complete search history.

(56) References Cited

U.S. PATENT DOCUMENTS

| 4,080,837 A | 3/1978 | Alexander et al. |
| 4,902,961 A | 2/1990 | De et al. |

(Continued)

FOREIGN PATENT DOCUMENTS

| CN | 103867900 A |   | 6/2014 |
| CN | 104565825 A | * | 4/2015 |

(Continued)

OTHER PUBLICATIONS

Gupta, Anand et al.; "Introduction to Pigging & a Case Study on Pigging of an Onshore Crude Oil Trunkline" IJLTEMAS, vol. V, Issue II, Feb. 2016; pp. 18-25.

(Continued)

*Primary Examiner* — Jason Lau
(74) *Attorney, Agent, or Firm* — Bracewell LLP; Constance G. Rhebergen; Brian H. Tompkins

(57) ABSTRACT

Provided are techniques for operating a pipeline that include: determining, based on observed operational parameters of equipment of an upstream process facility, an indirect quality parameter for processed production fluid output from the process facility and routed into a pipeline; determining, based on characteristics of the processed production fluid output from the facility, a direct quality parameter for the processed fluid; determining a quality parameter for the processed fluid defined as the greater of the indirect and the direct quality parameter for the processed fluid; determining, based on the quality parameter for the processed fluid, a model of the pipeline that includes a cumulative water accumulation of a segment of the pipeline; determining, based on the cumulative water accumulation, a water remediation schedule for the segment; and conducting, in accordance with the schedule, a water remediation operation in the segment of the pipeline.

21 Claims, 5 Drawing Sheets

(51) Int. Cl.
*B01D 17/12* (2006.01)
*C02F 1/40* (2023.01)
*C02F 1/00* (2023.01)
*E21B 43/34* (2006.01)
*F16L 55/26* (2006.01)
*B08B 9/055* (2006.01)
*F17D 3/14* (2006.01)
*F17D 3/16* (2006.01)
*F16L 101/12* (2006.01)
*C02F 101/32* (2006.01)

(52) U.S. Cl.
CPC ............... *C02F 1/008* (2013.01); *C02F 1/40* (2013.01); *E21B 43/34* (2013.01); *F16L 55/26* (2013.01); *F17D 3/14* (2013.01); *F17D 3/16* (2013.01); *B08B 2209/055* (2013.01); *C02F 2101/32* (2013.01); *C02F 2303/22* (2013.01); *F16L 2101/12* (2013.01)

(56) References Cited

U.S. PATENT DOCUMENTS

| | | | |
|---|---|---|---|
| 9,921,129 | B2 | 3/2018 | Giunta et al. |
| 9,989,956 | B2 | 6/2018 | Patwardhan |
| 10,393,916 | B2 | 8/2019 | Ma et al. |
| 10,430,725 | B2 | 10/2019 | Anderson et al. |
| 2017/0136388 | A1 | 5/2017 | Al-Shafei et al. |

FOREIGN PATENT DOCUMENTS

| | | | |
|---|---|---|---|
| CN | 104565825 | A | 4/2015 |
| CN | 106067141 | A | 11/2016 |
| GB | 2289760 | B | 10/1997 |
| WO | 2002096574 | A1 | 12/2002 |
| WO | 2005119390 | A2 | 12/2005 |
| WO | 2014015096 | A2 | 1/2014 |
| WO | 2019137206 | A1 | 7/2019 |

OTHER PUBLICATIONS

Langsholt, Morten et al.; "Liquid Accumulation in Gas-Condensate Pipelines—An Experimental Study" 13th International Conference on Multiphase Production Technology, Jun. 13-15, 2007, Edinburgh, UK; pp. 1-15.

Pall Corporation; "Pipeline Contamination Control for the Oil & Gas Industry" Jun. 2010; pp. 1-8.

Wikipedia; "Basic sediment and water" available as of Oct. 28, 2019 at: https://en.wikipedia.org/wiki/Basic_sediment_and_water; 1 pg.

Wright, Alistair W. et al.; "Simulating the Impact of Water Accumulation in Crude Oil Pipeline Networks" Stream Systems Ltd., 2016; pp. 1-12.

Xu, Guang-li et al.; "Trapped water displacement from low sections of oil pipelines" International Journal of Multiphase Flow 37 (2011); pp. 1-11.

Hu, Haitao et al.; "Modeling by computational fluid dynamics simulation of pipeline corrosion in CO2-containing oil-water two phase flow" Journal of Petroleum Science and Engineering 146 (2016); pp. 134-141.

Lagad, Vishal et al.; "Software System for Automatic Internal Corrosion Direct Assessment of Pipelines" Paper No. 04197, Corrosion 2004, NACE International, pp. 1-16.

\* cited by examiner

PIPELINE WATER REMEDIATION BASED ON UPSTREAM PROCESS OPERATING PARAMETERS

FIELD

Embodiments relate generally to operation of pipeline networks and more particularly to monitoring and remediation of water accumulation in oil pipelines.

BACKGROUND

Pipelines are used to transport fluids and gases from one location to another. In the oil industry, oil pipelines are often used to transport oil from upstream facilities, such as oil production plants, to downstream facilities, such as oil storage facilities and oil refineries. For example, oil produced at an oil well may be treated by a gas-oil separation plant (GOSP) located at or near the well to separate crude oil from the produced fluids, and the separated crude oil may be routed into an oil pipeline that carries the crude oil to a storage facility or another downstream facility for processing.

In most instances, oil produced from an oil well includes crude oil and some amount of water that is entrained/emulsified in the crude oil. Unfortunately, the entrained/emulsified water can create significant issues within a pipeline network. For example, as the production flows through a pipeline, the entrained/emulsified water can separate from the crude oil and settle at low spots in the pipeline, which can, in turn, cause corrosion of the pipeline walls. Left untreated, the water buildup and resulting corrosion can lead to leaks at the low spots of the pipeline.

SUMMARY

Monitoring and remediating water accumulation can be a critical aspect of operating a pipeline. If water accumulation in an oil pipeline is not properly monitored and remediated, for example, corrosion resulting from water accumulation can lead to failure of the pipeline. In many instances, midstream operators conduct pipeline remediation operations, such as pipeline scraping (or "pigging") operations, to inhibit and remove accumulated water from pipelines. Scraping operations typically involve inserting a tool (often referred to as a "pig" or "scraper") into an upstream location in the pipeline (often referred to as a "pig launcher" or "launching station") and allowing the pressure driven flow of the fluid in the pipeline push the device downstream to a downstream location in the pipeline (often referred to as a "pig catcher" or "receiving station"). As the pig travels down the pipeline, it may clean the pipeline by forcing accumulated water and debris down the pipeline.

Although existing scraping operations can be effective, they can add complexity and costs to operating a pipeline. Thus, it is typically desirable to conduct scraping operations on an as-needed basis, in an effort to avoid unnecessary costs while maintaining the integrity of the pipeline. Unfortunately, determining when to conduct a scraping operation can be difficult. For example, an operator may not know when and where water has accumulated in a pipeline, and, in an abundance of caution, may conduct scraping operations on a regular basis (e.g., every 3 months) based on pipeline fluid flow rates, which can increase operating costs and complexity. On the other hand, an operator that is unaware of water accumulation in a pipeline may forgo scraping operations, which can increase a risk of damage to the pipeline.

Provided in some embodiments are systems and methods for conducting pipeline water remediation operations based on characteristics of upstream processes. In some embodiments, a pipeline system is maintained based on direct data (e.g., measurements of characteristics of processed production flowing into the pipeline) and indirect data (e.g., operational parameters of one or more upstream process facilities that generate the processed production fluid flowing into the pipeline). For example, in the case of an upstream processing facility being a Gas-Oil Separation Plant (GOSP) that employs dehydration and desalter units to separate water and salt from wet crude to generate dry crude that is routed into a pipeline, indirect quality parameters for the dry crude may be determined based on observed operating parameters of the dehydration and desalter units, and direct quality parameters for the dry crude may be determined based on measured characteristics of the dry crude. Quality parameters for the dry crude for one or more points in time may be determined as a greater of the indirect quality parameter and the direct quality parameter for the respective points in time. The quality parameters determined may be provided as inputs to a pipeline modeling application that applies the quality parameters to generate a pipeline model that includes estimates of water accumulation in the pipeline. The estimates of water accumulation may, in turn, be used to generate a scraping (or "pigging") schedule that specifies one or more times for scraping (or "pigging") segments of the pipeline. Scraping operations may be conducted for segments of the pipeline in accordance with the scraping schedule.

Provided in some embodiments is a method of operating a pipeline that includes the following: determining, based on observed operational parameters of equipment of an upstream process facility, an indirect quality parameter for processed production fluid output from the upstream process facility and routed into a pipeline downstream of the upstream process facility; determining, based on measurements of characteristics of the processed production fluid output from the upstream process facility, a direct quality parameter for the processed production fluid; determining a quality parameter for the processed production fluid that is defined as the greater of the indirect quality parameter and the direct quality parameter for the processed production fluid; determining, based on the quality parameter for the processed production fluid, a model of the pipeline that includes a cumulative water accumulation of a segment of the pipeline; determining, based on the cumulative water accumulation of the segment of the pipeline, a water remediation schedule for the segment of the pipeline; and conducting, in accordance with the water remediation schedule for the segment of the pipeline, a water remediation operation in the segment of the pipeline.

In some embodiments, the water remediation operation includes scraping of the segment of the pipeline. In certain embodiments, the observed operational parameters of equipment of the upstream process facility are indicative of a duration of time that equipment of the upstream process facility is offline, and the indirect quality parameter for the processed production fluid is determined based on the duration of time that the equipment of the upstream process facility is offline. In some embodiments, wet crude oil is processed by the equipment of the upstream process facility to generate dry crude oil, the processed production fluid includes the dry crude oil, the upstream process facility includes a gas oil separation plant (GOSP), the equipment includes: a dehydration unit that is adapted to remove water from the wet crude oil; and a basic sediment and water (BS&W) analyzer that is adapted to measure a BS&W of the processed production fluid output from the upstream process facility, the observed operational parameters of the upstream process facility are indicative of a duration of time that dehydration unit is offline, the indirect quality parameter for the processed production fluid includes an indirect BS&W quality parameter determined based on the duration of time that the dehydration unit is offline, and the direct quality parameter for the processed production fluid includes a direct BS&W quality parameter determined based on a measure of BS&W of the processed production fluid output from the upstream process facility that is obtained by way of the BS&W analyzer. In certain embodiments, the method further includes determining a relationship of BS&W quality to duration of time that the dehydration unit is offline, and the indirect BS&W quality parameter is determined based on application of the duration of time that the dehydration unit is offline to the relationship of BS&W quality to duration of time that the dehydration unit is offline. In some embodiments, the method further includes: determining a maximum BS&W quality parameter that corresponds to a water cut of the wet crude oil entering the dehydration unit; determining a dehydration unit fall-off time that includes a duration of time for dehydration unit to reach the maximum BS&W quality parameter; and determining a dehydration ratio defined by the duration of time that the dehydration unit is offline to the dehydration unit fall-off time, and the indirect BS&W quality parameter is determined as the maximum BS&W quality parameter multiplied by the dehydration ratio. In certain embodiments, the measurements of the characteristics of the processed production fluid output from the upstream process facility include BS&W measurements acquired by way of a BS&W analyzer.

Provided in some embodiments is a pipeline system that includes the following: an upstream process facility including: equipment adapted to process production fluid to generate processed production fluid that is output from the upstream process facility and routed into a pipeline downstream of the upstream process facility; and an upstream control system adapted to: determine, based on observed operational parameters of the equipment of the upstream process facility, an indirect quality parameter for the processed production fluid; determine, based on measurements of characteristics of the processed production fluid output from the upstream process facility, a direct quality parameter for the processed production fluid; determine a quality parameter for the processed production fluid that is defined as the greater of the indirect quality parameter and the direct quality parameter for the processed production fluid; a pipeline system including: the pipeline; and a pipeline control system adapted to: determine, based on the quality parameter for the processed production fluid, a model of the pipeline that includes a cumulative water accumulation of a segment of the pipeline; determine, based on the cumulative water accumulation of the segment of the pipeline, a water remediation schedule for the segment of the pipeline; and conduct, in accordance with the water remediation schedule for the segment of the pipeline, a water remediation operation in the segment of the pipeline.

In some embodiments, the water remediation operation includes scraping of the segment of the pipeline. In certain embodiments, the observed operational parameters of equipment of the upstream process facility are indicative of a duration of time that equipment of the upstream process facility is offline, and the indirect quality parameter for the processed production fluid is determined based on the duration of time that the equipment of the upstream process facility is offline. In some embodiments, the production fluid includes wet crude oil, the processed production fluid includes dry crude oil, the upstream process facility includes a gas oil separation plant (GOSP), the equipment includes: a dehydration unit that is adapted to remove water from the wet crude oil; and a basic sediment and water (BS&W) analyzer that is adapted to measure a BS&W of the processed production fluid output from the upstream process facility, the observed operational parameters of the upstream process facility are indicative of a duration of time that dehydration unit is offline, the indirect quality parameter for the processed production fluid includes an indirect BS&W quality parameter determined based on the duration of time that the dehydration unit is offline, and the direct quality parameter for the processed production fluid includes a direct BS&W quality parameter determined based on a measure of BS&W of the processed production fluid output from the upstream process facility that is obtained by way of the BS&W analyzer. In certain embodiments, the upstream control system is further adapted to determine a relationship of BS&W quality to duration of time that the dehydration unit is offline, and the indirect BS&W quality parameter is determined based on application of the duration of time that the dehydration unit is offline to the relationship of BS&W quality to duration of time that the dehydration unit is offline. In some embodiments, the upstream control system is further adapted to, determine a maximum BS&W quality parameter that corresponds to a water cut of the wet crude oil entering the dehydration unit, determine a dehydration unit fall-off time that includes a duration of time for dehydration unit to reach the maximum BS&W quality parameter and determine a dehydration ratio defined by the duration of time that the dehydration unit is offline to the dehydration unit fall-off time, and the indirect BS&W quality parameter is determined as the maximum BS&W quality parameter multiplied by the dehydration ratio. In certain embodiments, the measurements of the characteristics of the processed production fluid output from the upstream process facility include BS&W measurements acquired by way of a BS&W analyzer.

Provided in some embodiments is a non-transitory computer readable storage medium having program instructions stored thereon that are executable by a processor to perform the following operations for operating a pipeline: determining, based on observed operational parameters of equipment of an upstream process facility, an indirect quality parameter for processed production fluid output from the upstream process facility and routed into a pipeline downstream of the upstream process facility; determining, based on measurements of characteristics of the processed production fluid output from the upstream process facility, a direct quality parameter for the processed production fluid; determining a quality parameter for the processed production fluid that is defined as the greater of the indirect quality parameter and the direct quality parameter for the processed production fluid; determining, based on the quality parameter for the processed production fluid, a model of the pipeline that includes a cumulative water accumulation of a segment of the pipeline; determining, based on the cumulative water accumulation of the segment of the pipeline, a water remediation schedule for the segment of the pipeline; and conducting, in accordance with the water remediation schedule for the segment of the pipeline, a water remediation operation in the segment of the pipeline.

In some embodiments, the water remediation operation includes scraping of the segment of the pipeline. In certain embodiments, the observed operational parameters of equipment of the upstream process facility are indicative of a duration of time that equipment of the upstream process facility is offline, and the indirect quality parameter for the processed production fluid is determined based on the duration of time that the equipment of the upstream process facility is offline. In some embodiments, wet crude oil is processed by the equipment of the upstream process facility to generate dry crude oil, the processed production fluid includes the dry crude oil, the upstream process facility includes a gas oil separation plant (GOSP), the equipment includes: a dehydration unit that is adapted to remove water from the wet crude oil; and a basic sediment and water (BS&W) analyzer that is adapted to measure a BS&W of the processed production fluid output from the upstream process facility, the observed operational parameters of the upstream process facility are indicative of a duration of time that dehydration unit is offline, the indirect quality parameter for the processed production fluid includes an indirect BS&W quality parameter determined based on the duration of time that the dehydration unit is offline, and the direct quality parameter for the processed production fluid includes a direct BS&W quality parameter determined based on a measure of BS&W of the processed production fluid output from the upstream process facility that is obtained by way of the BS&W analyzer. In certain embodiments, the operations further include determining a relationship of BS&W quality to duration of time that the dehydration unit is offline, and the indirect BS&W quality parameter is determined based on application of the duration of time that the dehydration unit is offline to the relationship of BS&W quality to duration of time that the dehydration unit is offline. In some embodiments, the operations further include: determining a maximum BS&W quality parameter that corresponds to a water cut of the wet crude oil entering the dehydration unit; determining a dehydration unit fall-off time that includes a duration of time for dehydration unit to reach the maximum BS&W quality parameter; and determining a dehydration ratio defined by the duration of time that the dehydration unit is offline to the dehydration unit fall-off time, and the indirect BS&W quality parameter is determined as the maximum BS&W quality parameter multiplied by the dehydration ratio. In certain embodiments, the measurements of the characteristics of the processed production fluid output from the upstream process facility include BS&W measurements acquired by way of a BS&W analyzer.

Figure 1:
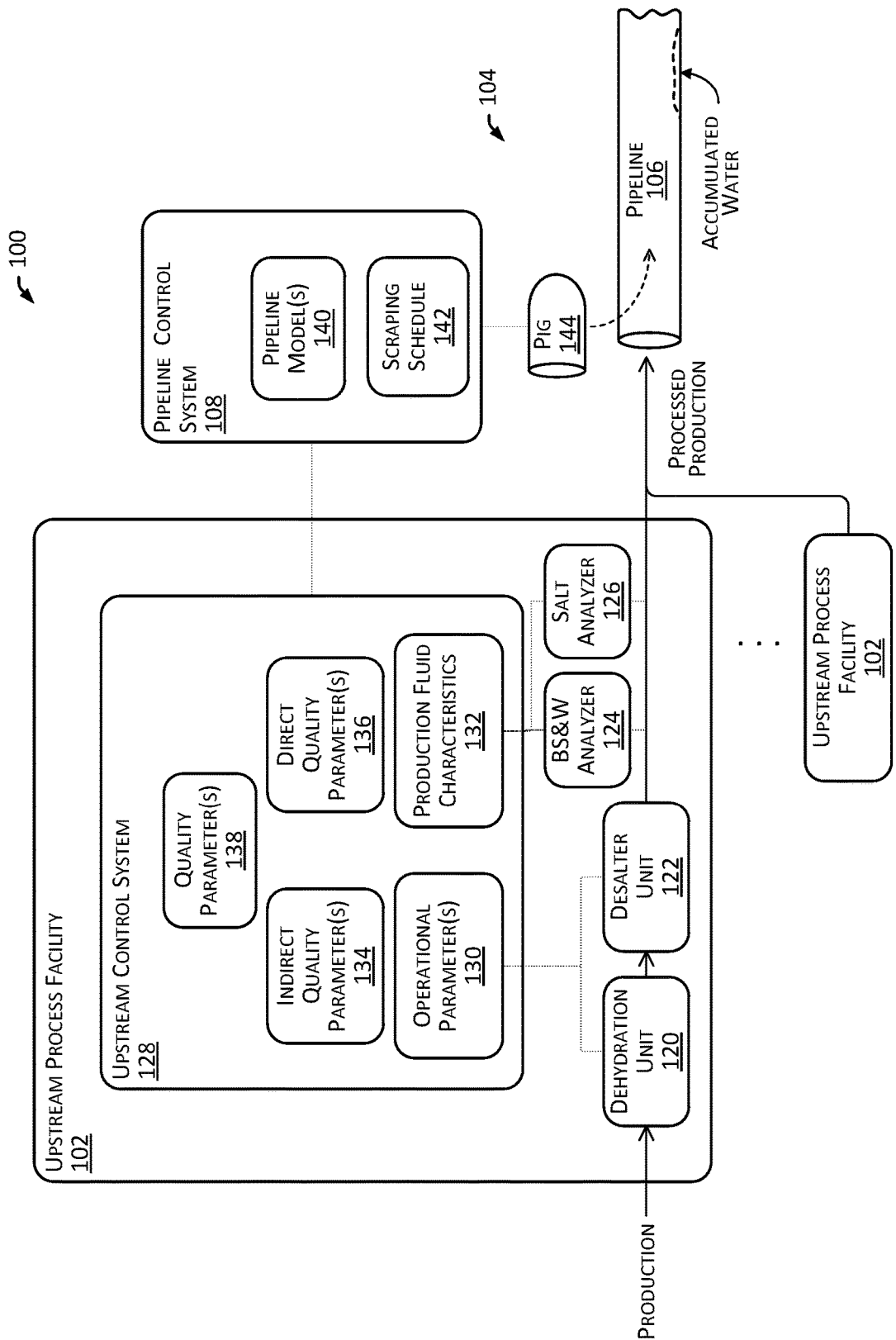
FIG. 1 is diagram that illustrates a production processing environment in accordance with one or more embodiments.

While this disclosure is susceptible to various modifications and alternative forms, specific embodiments are shown by way of example in the drawings and will be described in detail. The drawings may not be to scale. It should be understood that the drawings and the detailed descriptions are not intended to limit the disclosure to the particular form disclosed, but are intended to disclose modifications, equivalents, and alternatives falling within the scope of the present disclosure as defined by the claims.

DETAILED DESCRIPTION

Described are embodiments of novel systems and methods for conducting pipeline water remediation operations based on characteristics of upstream processes. In some embodiments, a pipeline system is maintained based on direct data (e.g., measurements of characteristics of processed production flowing into the pipeline) and indirect data (e.g., operational parameters of one or more upstream process facilities that generate the processed production fluid flowing into the pipeline). For example, in the case of an upstream processing facility being a Gas-Oil Separation Plant (GOSP) that employs dehydration and desalter units to separate water and salt from wet crude to generate dry crude that is routed into a pipeline, indirect quality parameters for the dry crude may be determined based on observed operating parameters of the dehydration and desalter units, and direct quality parameters for the dry crude may be determined based on measured characteristics of the dry crude. Quality parameters for the dry crude for one or more points in time may be determined as a greater of the indirect quality parameter and the direct quality parameter for the respective points in time. The quality parameters determined may be provided as inputs to a pipeline modeling application that applies the quality parameters to generate a pipeline model that includes estimates of water accumulation in the pipeline. The estimates of water accumulation may, in turn, be used to generate a scraping (or "pigging") schedule that specifies one or more times for scraping (or "pigging") segments of the pipeline. Scraping operations may be conducted for segments of the pipeline in accordance with the scraping schedule. Although certain embodiments are described in the context of GOSPs for the purpose of illustration, the techniques described may be applied in other context, such as in other types of hydrocarbon processing facilities.

FIG. 1 is diagram that illustrates a production processing environment ("environment") 100 in accordance with one or more embodiments. The environment includes upstream process facilities 102 and a pipeline system 104. In some embodiments, each upstream process facility 102 processes incoming production fluid (or "production") to generate processed production that is routed to downstream facilities by way of the pipeline system 104 and other midstream facilities. As described, the pipeline system 104 may include a pipeline 106 that routes the processed production to downstream facilities and a pipeline control system 108 that monitors and control operations of the pipeline system 104 based on direct data (e.g., measurements of characteristics of processed production flowing into the pipeline 106) and indirect data (e.g., operational parameters of the upstream process facilities 102).

In some embodiments, the production includes crude oil and some or all of the upstream process facilities 102 include a gas-oil separation plant (GOSP). Each GOSP type upstream process facility 102 may be located at or near one or more oil wells and be operable to separate water and sediments from production fluid (e.g., wet crude oil) extracted from the one or more oil wells to generate a stream of processed production fluid (e.g., dry crude oil). In such an embodiment, the pipeline 106 may be an oil pipeline that that carries the processed production (e.g., the dry crude oil) to a storage facility or another downstream facility for processing.

In some embodiments, each upstream process facility 102 includes process equipment that operates to separate crude oil from production fluid. Continuing with the example of the upstream process facilities 102 including GOSPs, each GOSP type upstream process facility 102 may include a dehydration unit 120 that is operable to remove water from the production fluid, a desalter unit 122 that is operable to remove salt from the production fluid, a basic sediment and water (BS&W) analyzer 124 that is operable to measure a BS&W characteristic of the processed production fluid, and a salt analyzer 126 that is operable to measure a salt in crude characteristic of the processed production fluid. Although the dehydration unit 120 and the desalter unit 122 are illustrated as two separate units, in some embodiments, the dehydration unit 120 and the desalter unit 122 may be integrated in to an integrated dehydration/desalter unit that is operable to remove water and salt from the production fluid. The BS&W analyzer 124 may be, for example, an online microwave BS&W analyzer.

In some embodiments, each upstream process facility 102 includes an upstream process facility monitoring and control system ("upstream control system") 128 that is operable to monitor and control operational parameters of the upstream process facility 102. In some embodiments, the upstream control system 128 includes a computer system that the same or similar to that described here with regard to at least FIG. 5. Continuing with the example of the upstream process facilities 102 including GOSPs, the upstream control system 128 of each GOSP type upstream process facility 102 may monitor and record observed operational parameters 130 that are indicative of observed operations of the equipment of the GOSP and monitor and record production fluid characteristics 132 that are indicative of measured characteristics of the processed production fluid that is output by the GOSP. In some embodiments, the observed operational parameters 130 are indicative of periods when the dehydration unit 120 or the desalter unit 122 are online or offline. For example, the observed operational parameters 130 may be indicative of voltage supplied to the dehydration unit 120 or the desalter unit 122, where a voltage at or above 100 volts (V) indicates that the respective unit is online and voltage below 100 V indicates that the respective unit is offline (or otherwise not operating correctly). In some embodiments, the production fluid characteristics 132 are indicative of values of BS&W of the processed production fluid (e.g., measured by way of a BS&W analyzer 124) and salt in crude of the processed production fluid (e.g., measured by way of a salt analyzer 126).

In some embodiments, operational parameters 130 are used to determine one or more indirect quality parameters 134 for processed production fluid output by an upstream process facility 102. For example, indirect quality parameters 134 of a BS&W characteristic or a salt-in-crude characteristic may be determined based on known relationships between operating parameters 130 of equipment of a GOSP type upstream process facility 102 and characteristics of processed production fluid output by the facility 102. A relationship between the duration that a piece of equipment in a GOSP type upstream process facility 102 is offline and the value of a quality parameter may be determined (e.g., determined based on testing or historical data assessment) and, in response to determining that the piece of equipment is offline for a given duration based on the operational parameters 130, a value of the quality parameter may be determined by application of the given duration to the relationship. These quality parameters may be referred to as "indirect" quality parameters in that the associated characteristics are determined indirectly based on relationships with other characteristics (and are not determined based on direct measurements of the characteristic of the processed production fluid). Accordingly, the operational parameters 130 may be referred to as "indirect process data."

Figure 2A:
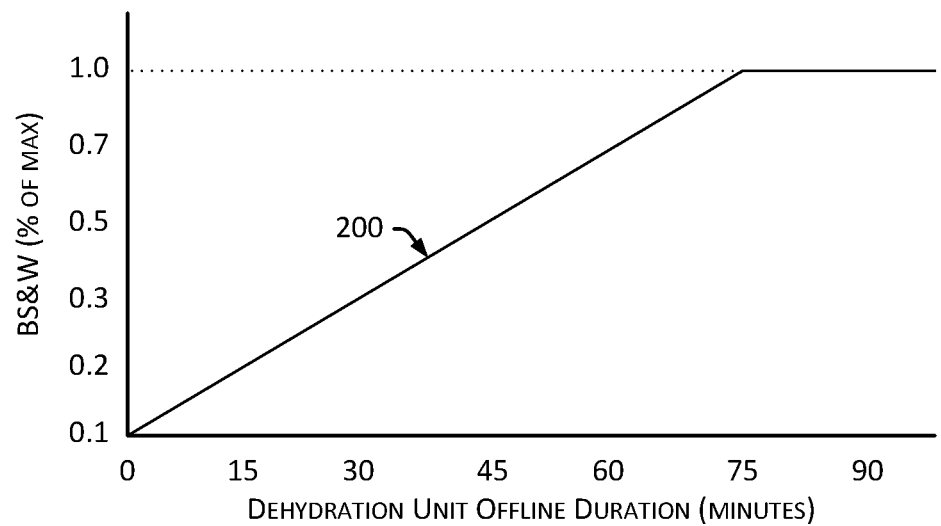
FIGS. 2A and 2B are diagrams that illustrate example relationships of characteristic of processed production to equipment operations in accordance with one or more embodiments.
Figure 2B:
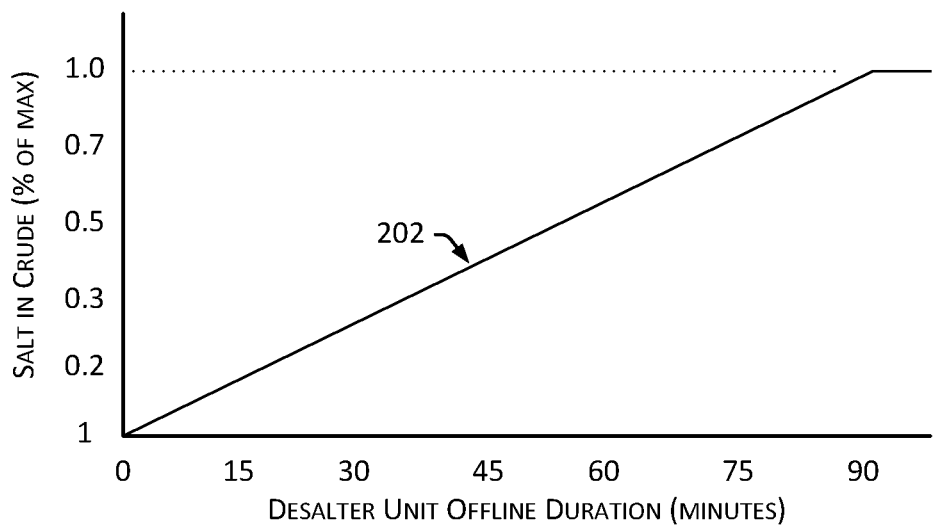

FIG. 2A is a diagram that illustrates an example relationship 200 of a BS&W characteristic of processed production fluid output by a GOSP type upstream process facility 102 to a duration that the dehydration unit 120 is offline, in accordance with one or more embodiments. The relationship 200 may be determined, for example, based on plant validation studies that assess historical performance of the dehydration unit 120 at various operating and test conditions. Based on the relationship 200, in response to the operational parameters 130 indicating that the dehydration unit 120 is offline for 15, 30, 45, 60 or 75 minutes it may be determined that the BS&W of corresponding processed production fluid output by the upstream process facility 102 is 0.2%, 0.3%, 0.5%, 0.7% or 1.0%, respectively. In some embodiments, the relationship 200 is determined based on a maximum BS&W for the dehydration unit 120 and a duration of offline time required for the dehydration unit 120 to reach the maximum BS&W (or a dehydration unit "fall-off" time). The maximum BS&W for the dehydration unit 120 may be the BS&W (e.g., the water cut) of production fluid entering the dehydration unit 120. The fall-off time of the dehydration unit 120 may be determined based on testing of the effectiveness of the dehydration unit 120 in response to being offline. In some embodiments, the relationship may be a linear relationship where the "indirect" BS&W ($BS\&W_{indirect}$) is determined as the maximum BS&W ($BS\&W_{max}$) multiplied by a ratio of the offline duration ($T_{offline\_dehyd}$) to the dehydration unit fall-off time ($T_{fall-off\_dehyd}$) (e.g., $BS\&W_{indirect}=BS\&W_{max} * (T_{offline\_dehyd}/T_{fall-off\_dehyd})$). A similar relationship may be determined for other types of equipment of the facility 102. For example, FIG. 2B is a diagram that illustrates an example relationship 202 of a salt in crude characteristic of processed production fluid output by a GOSP type upstream process facility 102 to a duration that the desalter unit 122 is offline, in accordance with one or more embodiments. The relationship 202 may be determined, for example, based on plant validation studies that assess historical performance of the desalter unit 122 at various operating and test conditions. Based on the relationship 202, in response to the operational parameters 130 indicating that the desalter unit 122 is offline for 20, 35, 55, 75 or 90 minutes it may be determined that the salt in crude of corresponding processed production fluid output by the upstream process facility 102 is 0.2, 0.3, 0.5, 0.7 or 1.0 pounds per thousand barrels (PTB), respectively. In some embodiments, the relationship 202 is determined based on a maximum salt in crude for the desalter unit 122 and a duration of offline time required for the desalter unit 122 to reach the maximum salt in crude (or a desalter unit 122 "fall-off" time). The maximum salt in crude for the desalter unit 122 may be the salt content of the wash water entering the desalter unit 122. The fall-off time of the desalter unit 122 may be determined based on testing of the effectiveness of the desalter unit 122 in response to being offline. In some embodiments, the relationship may be a linear relationship where the "indirect" salt in crude ($SIC_{indirect}$) is determined as the maximum salt in crude ($SIC_{max}$) multiplied by a ratio of the offline duration ($T_{offline\_desalt}$) to the desalter unit fall-off time ($T_{fall-off\_desalt}$) (e.g., $SIC_{indirect}=SIC_{max}*(T_{offline\_desalt}/T_{fall-off\_desalt})$).

In some embodiments, production fluid characteristics 132 are used to determine one or more direct quality parameters 136 for processed production fluid. For example, direct quality parameters 136 of a BS&W characteristic or a salt-in-crude characteristic may be determined based on measured characteristics of processed production fluid output by a GOSP type upstream process facility 102. For example, a BS&W characteristic of processed production fluid output by a GO SP type upstream process facility 102 may be determined based on a BS&W measurement obtained by way of a BS&W analyzer 124 of the facility 102. A salt in crude characteristic of the processed production fluid output by the GOSP type upstream process facility 102 may be determined based on a salt in crude measurement obtained by way of the salt analyzer 126 of the facility 102. These quality parameters may be referred to as "direct" quality parameters in that the associated characteristics are determined based on direct measurements of the characteristic of the processed production fluid. Accordingly, the production fluid characteristics 132 may be referred to as "direct process data."

In some embodiments, indirect quality parameters 134 and direct quality parameters 136 are used to determine quality parameter 138 for processed production fluid. For example, a quality parameter 138 for processed production fluid output by a GOSP type upstream process facility 102 for a given point in time may be determined as the greater of an indirect quality parameter 134 for the time and a direct quality parameter 136 for the time. Thus, for example, if an BS&W indirect quality parameter 134 for processed production fluid output by the facility 102 on January 1$^{st}$ at 1:00 pm is determined to be 0.3% volume (e.g., determined based on operating parameters 130 of equipment of the facility 102 at or shortly before that time) and a BS&W direct quality parameter 136 for the processed production fluid output by the facility 102 on January 1$^{st}$ at 1:00 pm is determined to be 0.4% volume (e.g., determined based on BS&W measurements obtained by way of a BS&W analyzer 124 of the facility 102 at about that time), then the BS&W quality parameter 138 for the processed production fluid for January 1$^{st}$ at 1:00 pm may be determined to be 0.4% volume. Such a determination may provide a robust system to account for water, sediments and salt that are in processed production fluid that flows into the pipeline 106, in the event some or all of a dehydration unit 120, a desalter unit 122, a BS&W analyzer 124 and a salt analyzer 126 of facility, are offline or otherwise not operating properly, or in the event a BS&W analyzer 124 or a salt analyzer 126 are not employed. For example, if a BS&W analyzer 124 of a GOSP type upstream process facility 102 is offline on January 1$^{st}$ at 2:00 pm and returns measurements that lead to a BS&W direct quality parameter 136 of 0.0% volume for January 1$^{st}$ at 2:00 pm and a BS&W indirect quality parameter 134 for the processed production fluid output by the upstream process facility 102 on January 1$^{st}$ at 2:00 pm is determined to be 0.3% volume, then the BS&W quality parameter 138 for the processed production fluid for January 1$^{st}$ at 2:00 pm may be determined to be 0.3% volume. This may account for water and sediments in processed production fluid that otherwise may be significantly underestimated (or overestimated) while a BS&W analyzer 124 is offline. In some instances, this can help to ensure that modeling of the pipeline 106 (and corresponding estimates of accumulated water accumulated water in the pipeline 106) reflects actual conditions, which can, in turn, provide for more efficient and effective maintenance the pipeline 106.

Figure 3:
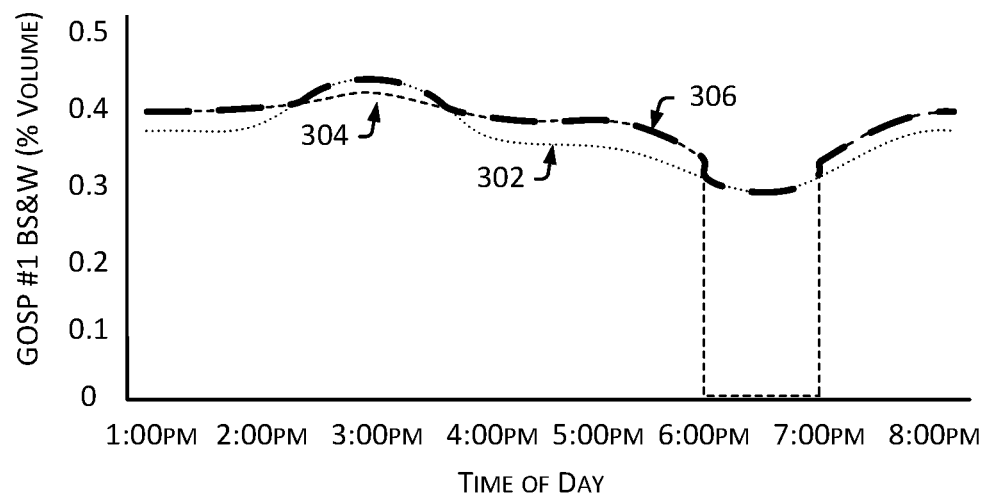
FIG. 3 is a diagram that illustrates example values of a quality parameter in accordance with one or more embodiments.

FIG. 3 is a diagram that illustrates example values of a BS&W quality parameter 138 for a GOSP type upstream process facility 102 over about a seven hour time period, in accordance with one or more embodiments. The diagram includes a BS&W indirect quality parameter curve 302 that illustrates values of a BS&W indirect quality parameter 134 of processed production fluid output by the facility 102 over the seven hour period (e.g., determined based on operational parameters 130 of the facility 102 over the seven hour time period). The diagram includes a BS&W direct quality parameter curve 304 that illustrates values of a BS&W direct quality parameter 136 of processed production fluid output by the facility 102 over the seven hour period (e.g., determined based on production fluid characteristics 132 that are determined from measurements by the BS&W analyzer 124 of the facility 102 over the seven hour time period). Notably, the direct quality parameter curve 304 includes a fall-off to a value of about zero for the approximately one hour time period from about 6:00 pm to 7:00 pm. This may, for example, represent a one hour time period during which the BS&W analyzer 124 is offline. The diagram includes a BS&W quality parameter curve 306 that illustrates values of a BS&W quality parameter 138 of processed production fluid output by the facility 102 over the seven hour period (e.g., with each value for a given point in time being the greater of the BS&W direct quality parameter value and the BS&W direct quality parameter value for the point in time. Notably, the BS&W quality parameter curve 306 initially tracks the relatively high value of the BS&W direct quality parameter from about 1:00 pm to about 2:30 pm, tracks the relatively high value of the BS&W indirect quality parameter from about 2:30 pm to about 3:30 pm, tracks the relatively high value of the BS&W direct quality parameter from about 3:30 pm to about 6:00 pm, tracks the relatively high value of the BS&W indirect quality parameter from about 6:00 pm to about 7:00 pm (e.g., the one hour time period when the BS&W analyzer 124 is offline), and tracks the relatively high value of the BS&W direct quality parameter from about 7:00 pm to about 8:00 μm. The values of the BS&W quality parameter curve 306 may be used an input to a model of the pipeline 106. Although a BS&W quality parameter curve 306 is illustrated for the purpose of illustration, a crude in salt quality parameter curve, or other quality parameter curves for other parameters of interest may be generated for the facility 102. Moreover, similar quality parameter curves may be generated for other upstream process facilities 102 which output processed production that is routed into the pipeline 106 (e.g., including other GOSP type upstream process facilities 102 that output dry crude that is routed into the pipeline 106), and corresponding values of the quality parameter curves may be provided to the pipeline control system 108 for use in modeling performance of the pipeline 106, including estimates of water accumulation within the pipeline 106, as described here.

In some embodiments, the pipeline 106 routes processed production from one or more upstream process facilities 102 to one or more downstream facilities. For example, in the case of the upstream process facilities 102 of the environment 100 including GOSP type upstream process facilities, the processed production (e.g., the dry crude oil) output from the facilities 102 may be routed to the pipeline 106, and the pipeline 106 may carry the processed production to a storage facility or another downstream facility for processing.

In some embodiments, the pipeline control system 108 monitors and control operations of the pipeline system 104. For example, the pipeline control system 108 may monitor conditions of the pipeline 106 and regulate pipeline operations based on the monitored conditions. For example, the pipeline control system 108 may monitor production flow in the pipeline and operate valves to regulate the flowrate and routing of production in the pipeline 106. In some embodiments, the pipeline control system 108 includes a computer system that the same or similar to that described here with regard to at least FIG. 5. In some embodiments, the pipeline control system 108 monitors characteristics of production flowing in the pipeline 106 and schedules maintenance operations, such as scraping operations, based on the monitored characteristics. For example, the pipeline control system 108 may monitor BS&W and salt in crude characteristics of processed production flowing in the pipeline 106, conduct modeling of the pipeline 106 based at least in part on the BS&W and salt in crude characteristics to determine estimates of water accumulation within the pipeline 106, and generate a scraping (or "pigging") schedule based on the estimates, where scraping operations for the pipeline 106 are conducted based on the scraping schedule.

In some embodiments, BS&W and salt in crude characteristics employed by the pipeline control system 108 include quality parameters 138 provided by upstream control systems 128 of one or more upstream process facilities 102 that output production that is routed into the pipeline 106. Continuing with the above examples relating to GOSP type upstream process facilities 102, in the case of ten GOSPs type upstream process facilities 102 outputting dry crude that is routed into the pipeline 106, each of upstream control system 128 of the ten facilities 102 may provide a BS&W and salt in crude quality parameters 138 at regular intervals (e.g., every 5 minutes), and the pipeline control system 108 may conduct modeling of the pipeline 106 based on the quality parameters 138 collected from the ten facilities 102 (e.g., using the BS&W and salt in crude quality parameters 138 as inputs to a modeling operation for the pipeline 106) to determine a pipeline model 140 that includes estimates of water accumulation within the pipeline 106, and generate a scraping (or "pigging") schedule 142 that specifies scraping of a first segment of the pipeline 106 on January $15^{th}$ based on the estimates. This may include the pipeline control system 108 collecting the BS&W quality parameters 138, salt in crude quality parameters 138, or other quality parameters 138 from the ten facilities 102 (e.g., including the BS&W quality parameters 138 of 0.4% and 0.3% for January $1^{st}$ at 1:00 pm and 1:15 pm, respectively), and providing the quality parameters 138 collected to a Pipeline Online Monitoring and Advisory Solution (POMAS) application (or similar pipeline modeling/simulation application) that generates a pipeline model 140 for the pipeline 106 (based on the quality parameters 138 collected) that includes estimates of water accumulation within the pipeline 106. The pipeline control system 108 (or another operator of the pipeline 106) may, in accordance with the scraping schedule, conduct a scraping operation on January $15^{th}$ that involves advancing a pig 144 through the segment of the pipeline 106. Thus, a scraping of the pipeline 106 may be scheduled and conducted based on direct data (e.g., measurements of characteristics of the processed production flowing into the pipeline 106) and indirect data (e.g., operational parameters of one or more upstream process facilities 102) regarding characteristics of production flowing in the pipeline 106.

Figure 4:
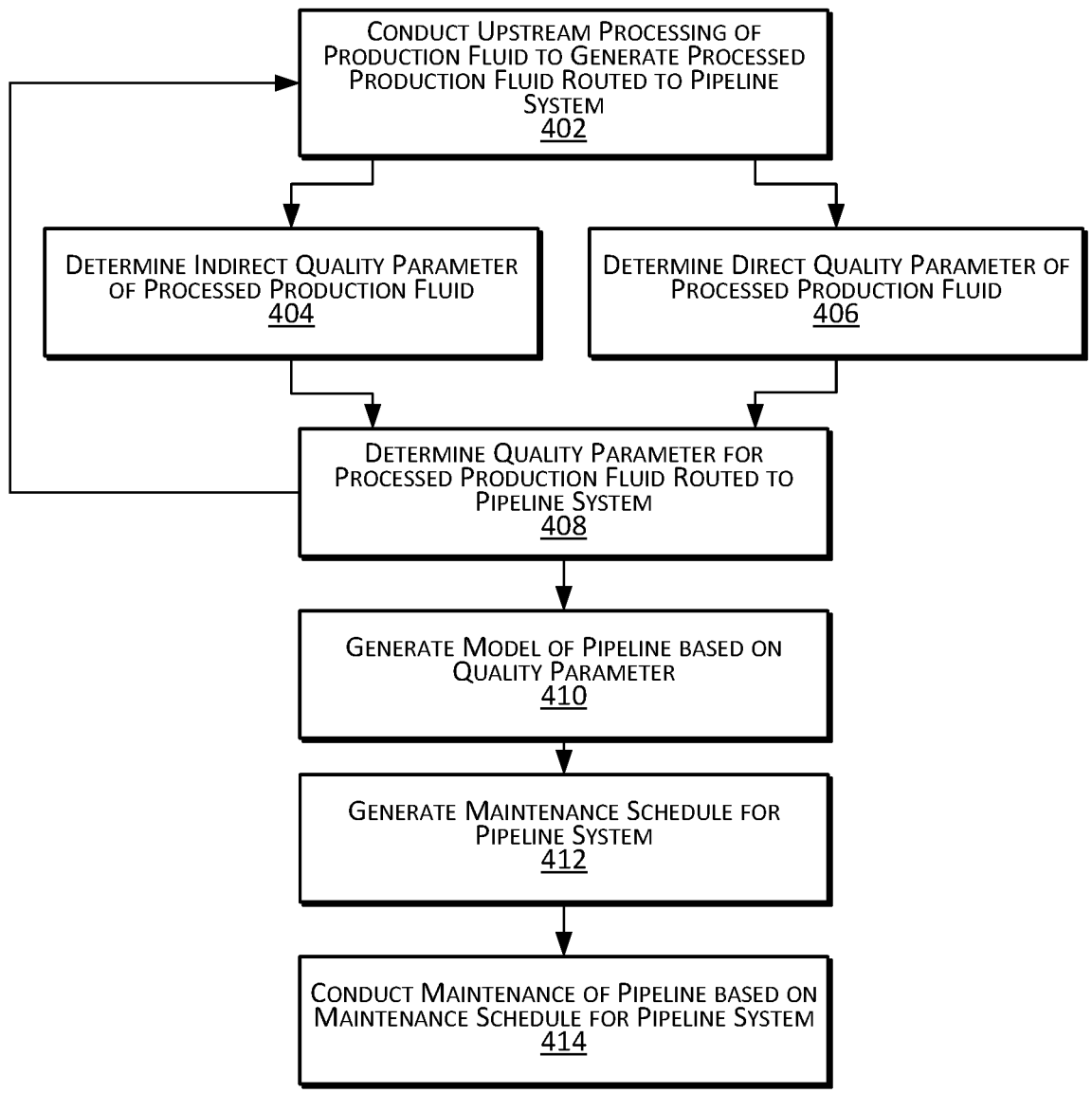
FIG. 4 is a flow diagram that illustrates a method of operating a pipeline in accordance with one or more embodiments.

FIG. 4 is a flowchart that illustrates a method 400 of operating a pipeline in accordance with one or more embodiments. In the context of the environment 100, some or all of the operations of method 400 may be performed, for example, by the upstream control system 128 (or another operator of the upstream process facility 102) or the pipeline control system 108 (or another operator of the pipeline system 104).

In some embodiments, method 400 includes conducting upstream processing of production fluid to generate processed production fluid that is routed to a pipeline system (block 402). This may include an upstream process facility 102 processing production fluid (e.g., wet crude) to generate processed production fluid (e.g., dry crude) that is routed into the pipeline 106 of the pipeline system 104. Continuing with the prior example of ten GOSP type upstream process facilities 102, this may include, for each the ten GOSPs generating processed production fluid (e.g., dry crude) that is routed into the pipeline 106 of the pipeline system 104, the upstream control system 128 of the GOSP (or another operator of the GOSP) performing the following: (a) controlling the dehydration unit 120 and the desalter unit 122 to separate water and salt from the wet crude received from one or more oil wells to generate dry crude that is routed to the pipeline 106 of the pipeline system 104; (b) collecting operational parameters 130 of the dehydration unit 120 and the desalter unit 122 (e.g., operational voltages of the dehydration unit 120 and the desalter unit 122); (c) controlling the BS&W analyzer 124 and the salt analyzer 126 to sense BS&W and salt in crude characteristics of the dry crude that is routed to the pipeline 106 of the pipeline system 104; and (d) collecting, from the BS&W analyzer 124 and the salt analyzer 126, corresponding measurements of BS&W and salt in crude characteristics of the dry crude that is routed to the pipeline 106 of the pipeline system 104.

In some embodiments, method 400 includes determining an indirect quality parameter of the processed production fluid that is routed to the pipeline system (block 404). This may include determining, based on operational parameters of equipment the upstream process facility 102 during processing of the processed production fluid, an indirect quality parameter 134 (e.g., indirect BS&W or salt in crude) of the processed production fluid that is routed into the pipeline 106 of the pipeline system 104. Continuing with the prior example of ten GOSP type upstream process facilities 102, this may include, for each the ten GOSPs generating processed production fluid (e.g., dry crude) that is routed into the pipeline 106 of the pipeline system 104, the upstream control system 128 of the GOSP (or another operator of the GOSP) determining a BS&W indirect quality parameter 134 based on observed operational parameters 130 for the dehydration unit 120 collected and a salt in crude indirect quality parameter 134 based on the operational parameters 130 of the desalter unit 122 collected. As described, the indirect quality parameters 134 of a BS&W characteristic or a salt-in-crude characteristic may be determined based on known relationships between operating parameters 130 of equipment of the upstream process facility 102 and characteristics of processed production fluid output by the upstream process facility 102, such as those of FIGS. 2A and 2B. This may be conducted for multiple points in time across a period of time to generate a corresponding time series dataset formed of indirect quality parameters across the period of time. For example, referring to FIG. 3, the BS&W indirect quality parameters 134 for a period from about 1:00 pm to about 8:00 pm may be assembled to generate a time series data set that corresponds to BS&W indirect quality parameter curve 302.

In some embodiments, method 400 includes determining a direct quality parameter of the processed production fluid that is routed to the pipeline system (block 406). This may include determining, based on measured characteristics of the processed production fluid, a direct quality parameter 136 (e.g., direct BS&W or salt in crude) of the processed production fluid that is routed into the pipeline 106 of the pipeline system 104. Continuing with the prior example of ten GOSP type upstream process facilities 102, this may include, for each the ten GOSPs generating processed production fluid (e.g., dry crude) that is routed into the pipeline 106 of the pipeline system 104, the upstream control system 128 of the GOSP (or another operator of the GOSP) determining a BS&W direct quality parameter 136 based on measurements of BS&W collected from the BS&W analyzer 124, and determining a salt in crude direct quality parameter 136 based on measurements of salt in crude collected from the salt analyzer 126. This may be conducted for multiple points in time across a period of time to generate a corresponding time series dataset of formed of direct quality parameters across the period of time. For example, referring to FIG. 3, the BS&W direct quality parameters 136 for a period from about 1:00 pm to about 8:00 pm may be assembled to generate a time series data set that corresponds to BS&W direct quality parameter curve 304.

In some embodiments, method 400 includes determining a quality parameter of the processed production fluid that is routed to the pipeline system based on the indirect quality parameter and the direct quality parameter (block 408). This may include determining a quality parameter 138 (e.g., BS&W or salt in crude) of the processed production fluid that is routed into the pipeline 106 of the pipeline system 104 for a given point in time that is defined by a greater of the indirect quality parameter and the indirect quality parameter for the given point in time. Continuing with the prior example of ten GOSP type upstream process facilities 102, this may include, for each the ten GOSPs generating processed production fluid (e.g., dry crude) that is routed into the pipeline 106 of the pipeline system 104, the upstream control system 128 of the GOSP (or another operator of the GOSP) comparing the BS&W an indirect quality parameter 134 (e.g., 0.3% volume associated with January $1^{st}$ at 1:00 pm) with a corresponding BS&W direct quality parameter 136 (e.g., 0.4% volume associated with January $1^{st}$ at 1:00 pm), and determining a corresponding quality parameter 138 (e.g., 0.4% volume for dry crude output from the GOSP on January $1^{st}$ at 1:00 pm). This may be conducted for multiple points in time across a period of time to generate a corresponding time series dataset formed of quality parameters across the period of time. For example, referring to FIG. 3, the BS&W quality parameters 138 for a period from about 1:00 pm to about 8:00 pm may be assembled to generate a time series data set that corresponds to BS&W quality parameter curve 306. Although a BS&W quality parameter curve 306 is illustrated for the purpose of illustration, a crude in salt quality parameter curve (or other quality parameter curves for other parameters of interest) may be generated for the GOSP. Moreover, similar quality parameter curves may be generated for each of the other nine upstream process facilities 102. In some embodiments, the quality parameters 138 are provided to the pipeline control system 108 for use in modeling performance of the pipeline 106, including estimates of debris and water accumulation within the pipeline 106, as described here. Continuing with the prior example of ten GOSP type upstream process facilities 102, this may include each of the GOSPs providing the determined quality parameters 138 (e.g., individually or as time series datasets) to the pipeline control system 108 for use in modeling performance of the pipeline 106, including estimates of water accumulation within the pipeline 106 that reflect characteristics of the comingled processed production from the ten GOSPs.

In some embodiments, method 400 includes generating a model of pipeline based on the quality parameter (block 410). This may include generating, based one or more quality parameters 138 (e.g., BS&W or salt in crude quality parameter 138) of processed production fluid that is routed into the pipeline 106, a pipeline model 140 that includes estimates of water or debris accumulation within the pipeline 106. Continuing with the prior example of ten GOSP type upstream process facilities 102, this may include the pipeline control system 108 (or another operator of the pipeline system 104) collecting the BS&W quality parameters 138 and salt in crude quality parameters 138 (or other quality parameters 138) from the ten GOSPs, and providing the quality parameters 138 collected to a pipeline modeling/simulation application (e.g., a Pipeline Online Monitoring and Advisory Solution (POMAS) application) that applies the quality parameters and other characteristics of the pipeline 106 (such as diameter of the pipeline 106, elevation variations of the segments of the pipeline 106, and flowrate, pressure and temperature of the comingled dry crude flowing in the pipeline 106) to generate a pipeline model 140 for the pipeline 106 that includes estimates of water accumulation within the pipeline 106 (e.g., including an estimated current water accumulation and estimates of daily water accumulation in the pipeline 106 over the following year).

In some embodiments, method 400 includes generating a maintenance schedule for the pipeline system based on the model of the pipeline (block 412). This may include generating, based a pipeline model 140 for the pipeline 106, a scraping schedule 142 that specifies a next date that a scraping type maintenance operation should be performed in one or more segments of the pipeline 106. For example, this may include the pipeline control system 108 (or another operator of the pipeline system 104) determining a threshold water accumulation amount (e.g., 10% blockage of the cross-section of the pipeline), determining estimates for total water accumulation within one or more segments of the pipeline 106 based on the pipeline model 140 for the pipeline 106, determining that the water accumulation within a segment of the pipeline 106 is estimated to exceed the threshold water accumulation amount on one or more days (e.g., Mar. 20, 2020 and again on Jun. 20, 2020) and, in response, generating a scraping schedule 142 that specifies that the segment of the pipeline 106 is scheduled for scraping operation on Mar. 20, 2020 and is tentatively scheduled for a second scraping operation on Jun. 20, 2020.

In some embodiments, method 400 includes conducting maintenance of the pipeline system based on the maintenance schedule (block 414). This may include conducting scraping operations of one or more segments of the pipeline 106 based on the scraping schedule 142 for the pipeline 106. For example, continuing with the prior example of a scraping schedule 142 that specifies that the segment of the pipeline 106 is scheduled for scraping operation on Mar. 20, 2020, this may include the pipeline control system 108 (or another operator of the pipeline system 104) conducting a scraping operation for the segment of the pipeline on (or around) Mar. 20, 2020. The scraping operation may include controlling an operation to advance a scraping type pig 144 through the identified segment of the pipeline 106. Advancement may include inserting the pig 144 into the pipeline 106 by way of a launching station located upstream of the segment of the pipeline 106, allowing the fluid flow to advance the pig 144 to a receiving station located downstream of the segment of the pipeline 106, and extracting the pig 144 from the pipeline by way of the receiving station.

Figure 5:
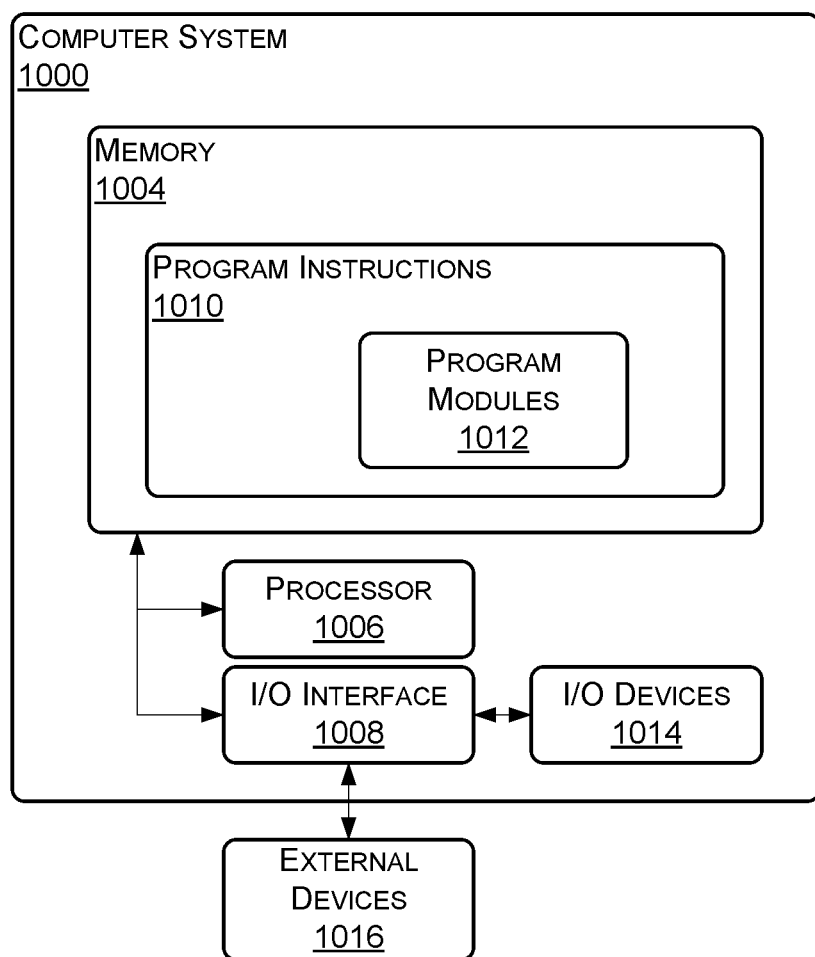
FIG. 5 is a diagram that illustrates an example computer system in accordance with one or more embodiments.

FIG. 5 is a diagram that illustrates an example computer system (or "system") 1000 in accordance with one or more embodiments. In some embodiments, the system 1000 is a programmable logic controller (PLC). The system 1000 may include a memory 1004, a processor 1006 and an input/output (I/O) interface 1008. The memory 1004 may include non-volatile memory (e.g., flash memory, read-only memory (ROM), programmable read-only memory (PROM), erasable programmable read-only memory (EPROM), electrically erasable programmable read-only memory (EEPROM)), volatile memory (e.g., random access memory (RAM), static random access memory (SRAM), synchronous dynamic RAM (SDRAM)), or bulk storage memory (e.g., CD-ROM or DVD-ROM, hard drives). The memory 1004 may include a non-transitory computer-readable storage medium having program instructions 1010 stored thereon. The program instructions 1010 may include program modules 1012 that are executable by a computer processor (e.g., the processor 1006) to cause the functional operations described, such as those described with regard to the upstream control system 128 (or another operator of the upstream process facility 102), the pipeline control system 108 (or another operator of the pipeline system 104), or one or more operations of the method 400.

The processor 1006 may be any suitable processor capable of executing program instructions. The processor 1006 may include a central processing unit (CPU) that carries out program instructions (e.g., the program instructions of the program modules 1012) to perform the arithmetical, logical, or input/output operations described. The processor 1006 may include one or more processors. The I/O interface 1008 may provide an interface for communication with one or more I/O devices 1014, such as a joystick, a computer mouse, a keyboard, or a display screen (e.g., an electronic display for displaying a graphical user interface (GUI)). The I/O devices 1014 may include one or more of the user input devices. The I/O devices 1014 may be connected to the I/O interface 1008 by way of a wired connection (e.g., an Industrial Ethernet connection) or a wireless connection (e.g., a Wi-Fi connection). The I/O interface 1008 may provide an interface for communication with one or more external devices 1016. In some embodiments, the I/O interface 1008 includes one or both of an antenna and a transceiver. In some embodiments, the external devices 1016 include equipment, such as the dehydration unit 120, the desalter unit 122, the BS&W analyzer 124, or the salt analyzer 126.

Further modifications and alternative embodiments of various aspects of the disclosure will be apparent to those skilled in the art in view of this description. Accordingly, this description is to be construed as illustrative only and is for the purpose of teaching those skilled in the art the general manner of carrying out the embodiments. It is to be understood that the forms of the embodiments shown and described here are to be taken as examples of embodiments. Elements and materials may be substituted for those illustrated and described here, parts and processes may be reversed or omitted, and certain features of the embodiments may be utilized independently, all as would be apparent to one skilled in the art after having the benefit of this description of the embodiments. Changes may be made in the elements described here without departing from the spirit and scope of the embodiments as described in the following claims. Headings used here are for organizational purposes only and are not meant to be used to limit the scope of the description.

It will be appreciated that the processes and methods described here are example embodiments of processes and methods that may be employed in accordance with the techniques described here. The processes and methods may be modified to facilitate variations of their implementation and use. The order of the processes and methods and the operations provided may be changed, and various elements may be added, reordered, combined, omitted, modified, and so forth. Portions of the processes and methods may be implemented in software, hardware, or a combination of software and hardware. Some or all of the portions of the processes and methods may be implemented by one or more of the processors/modules/applications described here.

As used throughout this application, the word "may" is used in a permissive sense (i.e., meaning having the potential to), rather than the mandatory sense (i.e., meaning must). The words "include," "including," and "includes" mean including, but not limited to. As used throughout this application, the singular forms "a", "an," and "the" include plural referents unless the content clearly indicates otherwise. Thus, for example, reference to "an element" may include a combination of two or more elements. As used throughout this application, the term "or" is used in an inclusive sense, unless indicated otherwise. That is, a description of an element including A or B may refer to the element including one or both of A and B. As used throughout this application, the phrase "based on" does not limit the associated operation to being solely based on a particular item. Thus, for example, processing "based on" data A may include processing based at least in part on data A and based at least in part on data B, unless the content clearly indicates otherwise. As used throughout this application, the term "from" does not limit the associated operation to being directly from. Thus, for example, receiving an item "from" an entity may include receiving an item directly from the entity or indirectly from the entity (e.g., by way of an intermediary entity). Unless specifically stated otherwise, as apparent from the discussion, it is appreciated that throughout this specification discussions utilizing terms such as "processing," "computing," "calculating," "determining," or the like refer to actions or processes of a specific apparatus, such as a special purpose computer or a similar special purpose electronic processing/computing device. In the context of this specification, a special purpose computer or a similar special purpose electronic processing/computing device is capable of manipulating or transforming signals, typically represented as physical, electronic or magnetic quantities within memories, registers, or other information storage devices, transmission devices, or display devices of the special purpose computer or similar special purpose electronic processing/computing device.

What is claimed is:

1. A method of operating a pipeline, the method comprising:
    determining, based on observed operational parameters of equipment of an upstream process facility, an indirect quality parameter for processed production fluid output from the upstream process facility and routed into a pipeline downstream of the upstream process facility;
    determining, based on measurements of characteristics of the processed production fluid output from the upstream process facility, a direct quality parameter for the processed production fluid;

determining a quality parameter for the processed production fluid that is defined as the greater of the indirect quality parameter and the direct quality parameter for the processed production fluid;

determining, based on the quality parameter for the processed production fluid, a model of the pipeline that comprises a cumulative water accumulation of a segment of the pipeline;

determining, based on the cumulative water accumulation of the segment of the pipeline, a water remediation schedule for the segment of the pipeline; and conducting, in accordance with the water remediation schedule for the segment of the pipeline, a water remediation operation in the segment of the pipeline.

2. The method of claim 1, wherein the water remediation operation comprises scraping of the segment of the pipeline.

3. The method of claim 1,
wherein the observed operational parameters of equipment of the upstream process facility are indicative of a duration of time that equipment of the upstream process facility is offline, and
wherein the indirect quality parameter for the processed production fluid is determined based on the duration of time that the equipment of the upstream process facility is offline.

4. The method of claim 3,
wherein wet crude oil is processed by the equipment of the upstream process facility to generate dry crude oil;
wherein the processed production fluid comprises the dry crude oil,
wherein the upstream process facility comprises a gas oil separation plant (GOSP),
wherein the equipment comprises:
a dehydration unit that is configured to remove water from the wet crude oil; and
a basic sediment and water (BS&W) analyzer that is configured to measure a BS&W of the processed production fluid output from the upstream process facility,
wherein the observed operational parameters of the upstream process facility are indicative of a duration of time that dehydration unit is offline,
wherein the indirect quality parameter for the processed production fluid comprises an indirect BS&W quality parameter determined based on the duration of time that the dehydration unit is offline, and
wherein the direct quality parameter for the processed production fluid comprises a direct BS&W quality parameter determined based on a measure of BS&W of the processed production fluid output from the upstream process facility that is obtained by way of the BS&W analyzer.

5. The method of claim 4, further comprising:
determining a relationship of BS&W quality to duration of time that the dehydration unit is offline,
wherein the indirect BS&W quality parameter is determined based on application of the duration of time that the dehydration unit is offline to the relationship of BS&W quality to duration of time that the dehydration unit is offline.

6. The method of claim 5, further comprising:
determining a maximum BS&W quality parameter that corresponds to a water cut of the wet crude oil entering the dehydration unit;

determining a dehydration unit fall-off time that comprises a duration of time for dehydration unit to reach the maximum BS&W quality parameter; and
determining a dehydration ratio defined by the duration of time that the dehydration unit is offline to the dehydration unit fall-off time,
wherein the indirect BS&W quality parameter is determined as the maximum BS&W quality parameter multiplied by the dehydration ratio.

7. The method of claim 1, wherein the measurements of the characteristics of the processed production fluid output from the upstream process facility comprise BS&W measurements acquired by way of a BS&W analyzer.

8. A pipeline system, comprising:
an upstream process facility comprising:
equipment configured to process production fluid to generate processed production fluid that is output from the upstream process facility and routed into a pipeline downstream of the upstream process facility; and
an upstream control system configured to:
determine, based on observed operational parameters of the equipment of the upstream process facility, an indirect quality parameter for the processed production fluid;
determine, based on measurements of characteristics of the processed production fluid output from the upstream process facility, a direct quality parameter for the processed production fluid;
determine a quality parameter for the processed production fluid that is defined as the greater of the indirect quality parameter and the direct quality parameter for the processed production fluid;
a pipeline system comprising:
the pipeline; and
a pipeline control system configured to:
determine, based on the quality parameter for the processed production fluid, a model of the pipeline that comprises a cumulative water accumulation of a segment of the pipeline;
determine, based on the cumulative water accumulation of the segment of the pipeline, a water remediation schedule for the segment of the pipeline; and
conduct, in accordance with the water remediation schedule for the segment of the pipeline, a water remediation operation in the segment of the pipeline.

9. The system of claim 8, wherein the water remediation operation comprises scraping of the segment of the pipeline.

10. The system of claim 8,
wherein the observed operational parameters of equipment of the upstream process facility are indicative of a duration of time that equipment of the upstream process facility is offline, and
wherein the indirect quality parameter for the processed production fluid is determined based on the duration of time that the equipment of the upstream process facility is offline.

11. The system of claim 10,
wherein the production fluid comprises wet crude oil;
wherein the processed production fluid comprises dry crude oil,
wherein the upstream process facility comprises a gas oil separation plant (GOSP), wherein the equipment comprises:
a dehydration unit that is configured to remove water from the wet crude oil; and
a basic sediment and water (BS&W) analyzer that is configured to measure a BS&W of the processed production fluid output from the upstream process facility,
wherein the observed operational parameters of the upstream process facility are indicative of a duration of time that dehydration unit is offline,
wherein the indirect quality parameter for the processed production fluid comprises an indirect BS&W quality parameter determined based on the duration of time that the dehydration unit is offline, and
wherein the direct quality parameter for the processed production fluid comprises a direct BS&W quality parameter determined based on a measure of BS&W of the processed production fluid output from the upstream process facility that is obtained by way of the BS&W analyzer.

12. The system of claim 10, wherein the upstream control system is further configured to:
determine a relationship of BS&W quality to duration of time that the dehydration unit is offline,
wherein the indirect BS&W quality parameter is determined based on application of the duration of time that the dehydration unit is offline to the relationship of BS&W quality to duration of time that the dehydration unit is offline.

13. The system of claim 10, wherein the upstream control system is further configured to:
determine a maximum BS&W quality parameter that corresponds to a water cut of the wet crude oil entering the dehydration unit;
determine a dehydration unit fall-off time that comprises a duration of time for dehydration unit to reach the maximum BS&W quality parameter; and
determine a dehydration ratio defined by the duration of time that the dehydration unit is offline to the dehydration unit fall-off time,
wherein the indirect BS&W quality parameter is determined as the maximum BS&W quality parameter multiplied by the dehydration ratio.

14. The system of claim 8, wherein the measurements of the characteristics of the processed production fluid output from the upstream process facility comprise BS&W measurements acquired by way of a BS&W analyzer.

15. A non-transitory computer readable storage medium comprising program instructions stored thereon that are executable by a processor to perform the following operations for operating a pipeline:
determining, based on observed operational parameters of equipment of an upstream process facility, an indirect quality parameter for processed production fluid output from the upstream process facility and routed into a pipeline downstream of the upstream process facility;
determining, based on measurements of characteristics of the processed production fluid output from the upstream process facility, a direct quality parameter for the processed production fluid;
determining a quality parameter for the processed production fluid that is defined as the greater of the indirect quality parameter and the direct quality parameter for the processed production fluid;

determining, based on the quality parameter for the processed production fluid, a model of the pipeline that comprises a cumulative water accumulation of a segment of the pipeline;
determining, based on the cumulative water accumulation of the segment of the pipeline, a water remediation schedule for the segment of the pipeline; and
conducting, in accordance with the water remediation schedule for the segment of the pipeline, a water remediation operation in the segment of the pipeline.

16. The medium of claim 15, wherein the water remediation operation comprises scraping of the segment of the pipeline.

17. The medium of claim 15,
wherein the observed operational parameters of equipment of the upstream process facility are indicative of a duration of time that equipment of the upstream process facility is offline, and
wherein the indirect quality parameter for the processed production fluid is determined based on the duration of time that the equipment of the upstream process facility is offline.

18. The medium of claim 17,
wherein wet crude oil is processed by the equipment of the upstream process facility to generate dry crude oil;
wherein the processed production fluid comprises the dry crude oil,
wherein the upstream process facility comprises a gas oil separation plant (GOSP),
wherein the equipment comprises:
a dehydration unit that is configured to remove water from the wet crude oil; and
a basic sediment and water (BS&W) analyzer that is configured to measure a BS&W of the processed production fluid output from the upstream process facility,
wherein the observed operational parameters of the upstream process facility are indicative of a duration of time that dehydration unit is offline,
wherein the indirect quality parameter for the processed production fluid comprises an indirect BS&W quality parameter determined based on the duration of time that the dehydration unit is offline, and
wherein the direct quality parameter for the processed production fluid comprises a direct BS&W quality parameter determined based on a measure of BS&W of the processed production fluid output from the upstream process facility that is obtained by way of the BS&W analyzer.

19. The medium of claim 18, the operations further comprising:
determining a relationship of BS&W quality to duration of time that the dehydration unit is offline,
wherein the indirect BS&W quality parameter is determined based on application of the duration of time that the dehydration unit is offline to the relationship of BS&W quality to duration of time that the dehydration unit is offline.

20. The medium of claim 19, the operations further comprising:
determining a maximum BS&W quality parameter that corresponds to a water cut of the wet crude oil entering the dehydration unit;
determining a dehydration unit fall-off time that comprises a duration of time for dehydration unit to reach the maximum BS&W quality parameter; and determining a dehydration ratio defined by the duration of time that the dehydration unit is offline to the dehydration unit fall-off time, wherein the indirect BS&W quality parameter is determined as the maximum BS&W quality parameter multiplied by the dehydration ratio.

21. The medium of claim 15, wherein the measurements of the characteristics of the processed production fluid output from the upstream process facility comprise BS&W measurements acquired by way of a BS&W analyzer.

* * * * *